United States Patent [19]

Pasley

[11] Patent Number: 5,215,234
[45] Date of Patent: Jun. 1, 1993

[54] UTILITY RACK FOR VEHICLES

[76] Inventor: Ralph J. Pasley, 715 S. Main, Shamrock, Tex. 79079

[21] Appl. No.: 764,668

[22] Filed: Sep. 23, 1991

[51] Int. Cl.$^5$ ............................................... B60R 9/06
[52] U.S. Cl. ............................... 224/42.43; 224/42.07; 224/42.08; 224/42.44; 224/42.03 A; 224/42.45 R
[58] Field of Search ................. 224/42.03 A, 42.03 R, 224/42.07, 42.08, 42.43, 42.44, 42.45 R, 42.04, 42.03 B; 108/115, 124, 44, 134, 135; 248/240.1-240.4

[56] References Cited

U.S. PATENT DOCUMENTS

| 527,339 | 10/1894 | Lins . | |
|---|---|---|---|
| 585,427 | 6/1897 | Burns | 248/240.4 |
| 824,779 | 7/1906 | Clark . | |
| 1,014,579 | 1/1912 | Edgington . | |
| 1,179,823 | 4/1916 | Greene | 224/42.45 R X |
| 1,348,220 | 8/1920 | Hathaway | 108/44 X |
| 1,419,166 | 6/1922 | Nelson . | |
| 1,482,770 | 2/1924 | Terrell | 224/42.45 R |
| 1,488,720 | 4/1924 | Tichy . | |
| 1,506,274 | 8/1924 | Specht | 224/42.03 R |
| 1,840,046 | 3/1932 | Arndt | 224/42.43 |
| 3,103,290 | 9/1963 | Perri | 224/42.08 X |
| 4,085,961 | 4/1978 | Brown | 296/37.6 |
| 4,087,032 | 5/1978 | Miller | 224/42.23 |
| 4,099,760 | 7/1978 | Mascotte et al. | 224/42.08 X |
| 4,228,936 | 10/1980 | Rife | 224/42.23 |
| 4,266,821 | 5/1981 | Gillet | 296/37.6 |
| 4,394,947 | 7/1983 | Tartaglia | 224/42.43 |
| 4,915,276 | 4/1990 | Devito | 224/42.43 |
| 4,948,169 | 8/1990 | Amundson | 280/769 |
| 5,033,662 | 7/1991 | Godin | 224/42.43 |
| 5,038,983 | 8/1991 | Tomososki | 224/42.43 |

FOREIGN PATENT DOCUMENTS

| 0039037 | 7/1928 | Denmark | 224/42.43 |
|---|---|---|---|
| 0121232 | 7/1927 | Switzerland | 224/42.43 |

Primary Examiner—Henry J. Recla
Assistant Examiner—Casey Jacyna
Attorney, Agent, or Firm—Dunlap, Codding & Lee

[57] ABSTRACT

An apparatus attachable to a vehicle frame to support and secure objects to be transported. A pair of female members are fixed to a plate which has mounting holes for attachment to the vehicle frame. A pair of male members are attached to a support assembly and platform for supporting the objects. Each male member is inserted into the corresponding female member and secured by pivot pins through aligning holes in the male and female members. The platform is designed to pivot between a carrying position and a storage position. A waterproof container with a locking, hinged lid is removably attached to the platform.

12 Claims, 4 Drawing Sheets

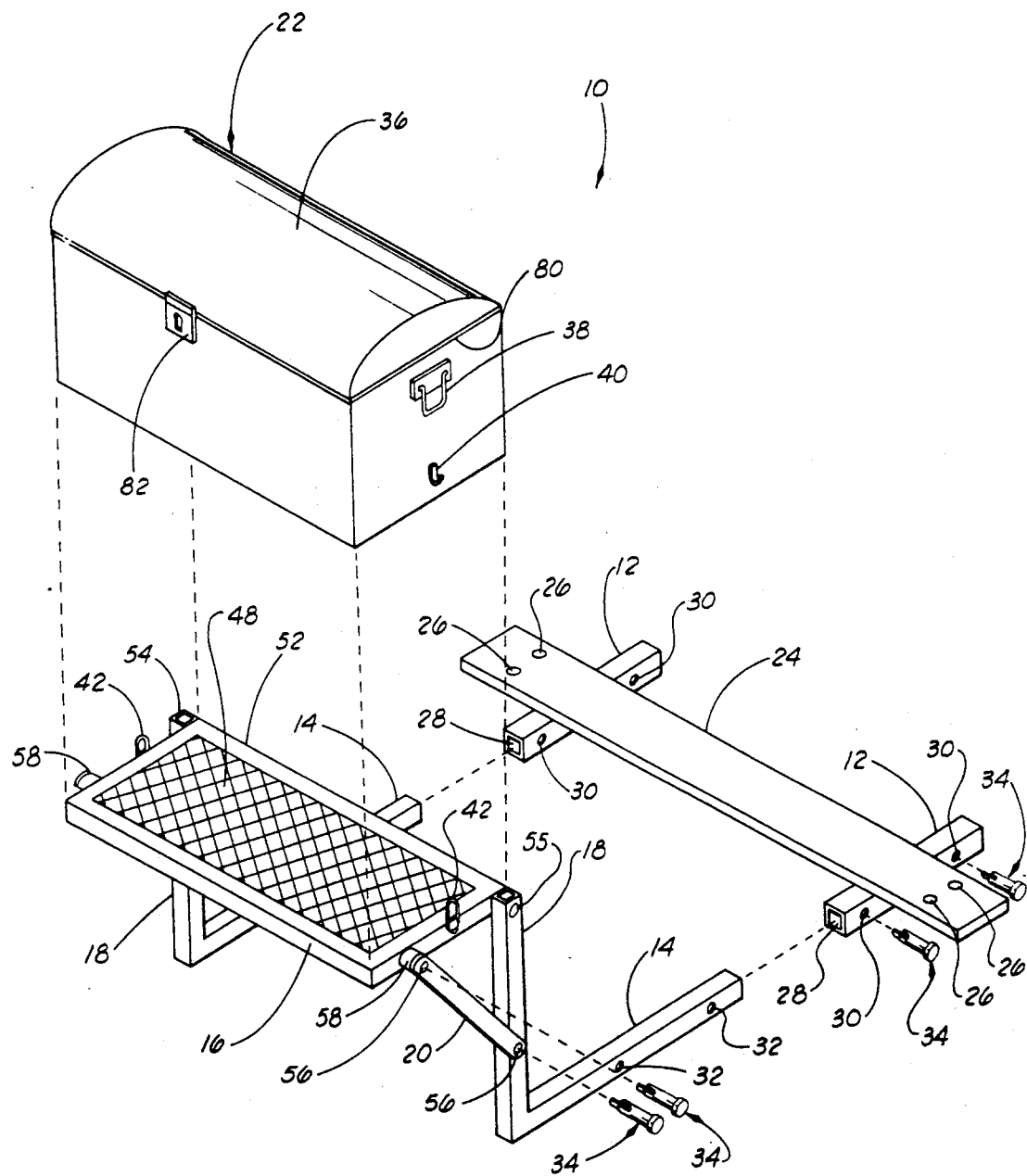

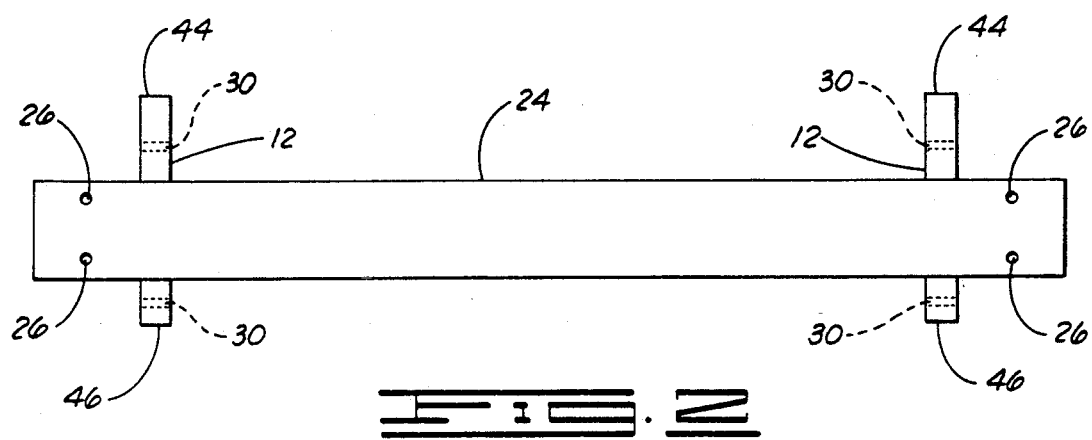
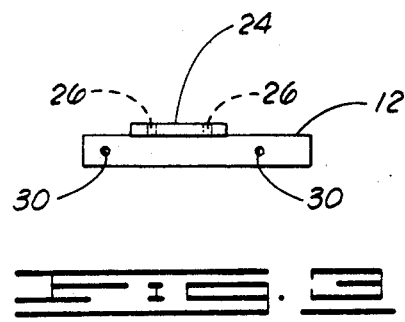
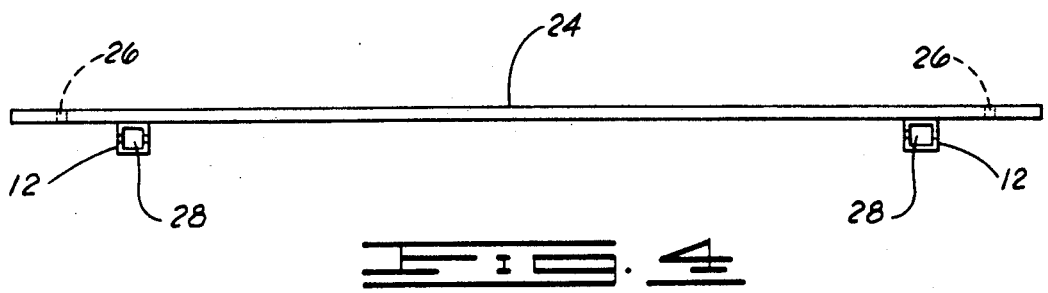

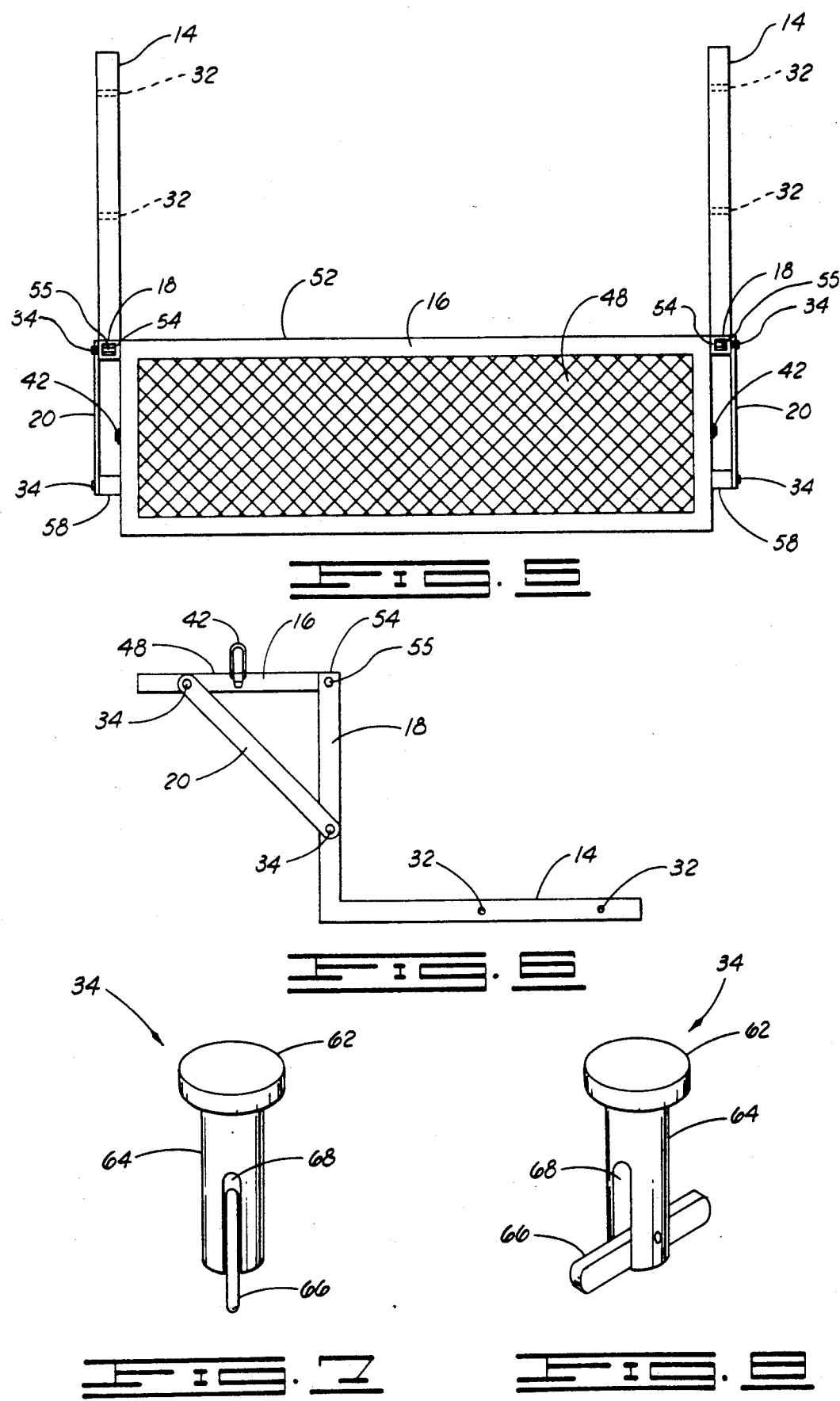

UTILITY RACK FOR VEHICLES

FIELD OF THE INVENTION

The present invention relates to a rack attachable to a vehicle and adapted for supporting and securing objects to be transported by the vehicle.

SUMMARY OF THE INVENTION

The present invention is a utility rack for attachment to the frame of a vehicle to provide storage space in addition to the passenger space and trunk space of the vehicle. The utility rack comprises a mounting plate secured to the frame of the vehicle, a pair of female members attached to the mounting plate, a pair of L-shaped male members removably secured to the female members, and a platform pivotally attached to and extending between the male members. The platform may be pivoted between a substantially horizontal transporting position and a substantially vertical storage position. A pair of diagonal members are provided to support the platform in the horizontal transporting position.

BRIEF DESCRIPTION OF THE DRAWINGS

FIG. 1 is an exploded perspective view of an apparatus constructed in accordance with the present invention.

FIG. 2 is a top plan view of the female members of FIG. 1.

FIG. 3 is a side elevation of the female members of FIG. 1.

FIG. 4 is a rear elevation of the female members of FIG. 1.

FIG. 5 is a top plan view of the male members, platform and support structure of FIG. 1.

FIG. 6 is a side elevation of FIG. 5.

FIG. 7 is a perspective view of one of the pivot pins of FIG. 1 with the lock member parallel to the pin body for insertion into a hole.

FIG. 8 is a perspective view of the pivot pin of FIG. 7 with the lock member perpendicular to the pin body for securing the pivot pin in a hole.

DETAILED DESCRIPTION OF THE PREFERRED EMBODIMENTS

Figure 9:
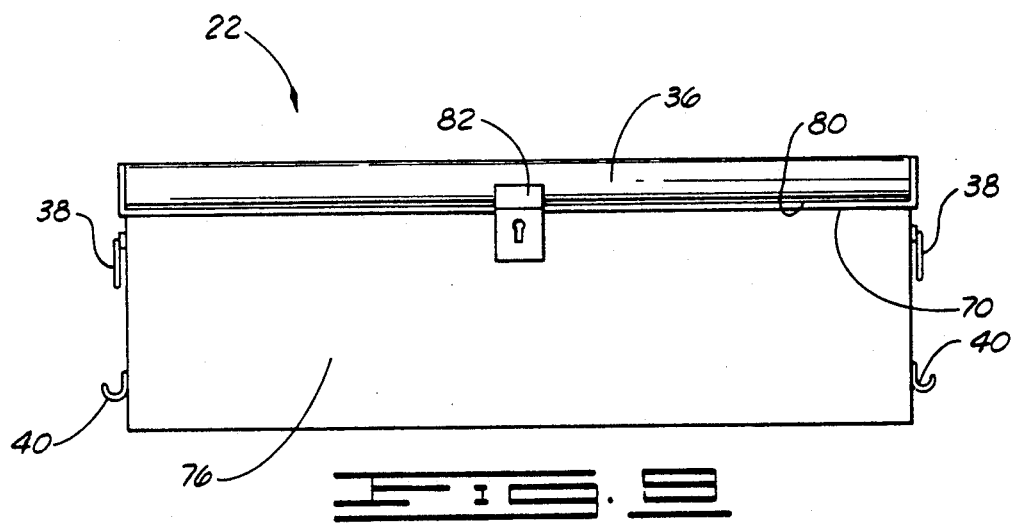
FIG. 9 is an elevational view of the container of FIG. 1 from the locking side.

Referring to the drawings in detail and to FIG. 1 in particular, reference character 10 generally designates a utility rack constructed in accordance with the present invention. The rack basically comprises a pair of elongated female members 12, a pair of elongated male members 14, a platform 16, a pair of vertical supports 18 and a pair of diagonal supports 20 for the platform 16, and a container 22 which may be secured to the platform 16.

As illustrated by FIGS. 1 through 4, the elongated female members 12 are secured to a mounting plate 24 for attachment to the underside of a vehicle frame (not shown). A plurality of mounting holes 26 are formed or drilled in the mounting plate 24 for attachment to the vehicle frame. The mounting holes 26 are suitably located for bolting the mounting plate 24 to the vehicle frame.

Each female member 12 has a longitudinal opening 28 extending at least a portion of the length of the female member 12. A plurality of holes 30 extend transversely through the longitudinal opening 28 of each female member 12. Each male member 14 is sized and shaped to fit within the longitudinal opening 28 of the corresponding female member 12. A hole 32 extends transversely through each male member 14 to align with each hole 30 of the corresponding female member 12 when the male members 14 are installed in the longitudinal openings 28 of the female members 12. A pivot pin 34 is inserted through each hole 30 of the female members 12 and the aligning hole 32 of the corresponding male member 14 to removably secure each male member 14 within the longitudinal opening 28 of the corresponding female member 12.

Continuing to refer to FIG. 1, the platform 16 is attached to the male members 14 by means of a pair of vertical supports 18 and a pair of diagonal supports 20. The container 22 is shaped to mount upon the platform 16 and includes a lid 36 and a set of handles 38. The container 22 is removably attached to the platform 16 by means of a hook 40 on each lateral side of the container 22 and a mating clasp 42 on each lateral side of the platform 16.

FIGS. 2 through 4 show the female members 12 and plate 24 separately. As best illustrated by FIG. 2, the female members 12 are positioned to be substantially parallel to each other and perpendicular to the plate 24. The female members 12 are preferably welded, glued or otherwise rigidly secured to the plate 24. The mounting holes 26 for attachment of the plate 24 to the vehicle frame extend through the plate 24 at points suitable for attachment of the plate 24 to the particular vehicle frame selected. Accordingly, the mounting holes 26 could be located outside the female members 12 as shown in FIG. 2, or between the female members 12, depending upon the shape of the vehicle frame. Preferably, two ½-inch diameter transverse holes 30 extend completely through the longitudinal opening 28 of each female member 12. In a preferred arrangement, one of the holes 30 is located toward the front end 44 of the female member 12 and one of the holes 30 is located toward the rear end 46 of the female member 12.

As best shown in FIG. 4, each female member 12 is square in cross-section, preferably made of 2-inch square aluminum or fiber-glass tubing. The plate 24 should be made from a like material, and be approximately ¼-inches thick and about six inches wide. The length of the plate 24 is dependent upon the dimensions of the particular vehicle frame selected for use with the utility rack 10.

FIGS. 5 and 6 show the male members 14, the platform 16, the vertical supports 18 and the diagonal supports 20. The male members 14 are preferably 1¾ inch square tubing to fit within the 2-inch square tubing of the female members 12. As best shown in FIG. 5, the transverse holes 32 extend completely through the male members 14. The holes 32 are preferably ½-inch in diameter and are located to align with the holes 30 of the corresponding female members 12 when the male members 14 are installed within the corresponding female members 12. The vertical supports 18 are preferably made of 1¾ inch square metal tubing and the diagonal supports 20 are preferably 1-inch wide rigid metal straps.

As best illustrated by FIG. 5, the platform 16 is preferably a rectangular framework of 1½ inch angle iron around a metal mesh support surface 48. The platform 16 and platform support surface 48 should be sturdy enough to support the container 22 and objects to be transported. Each lateral side of the front end 52 of the platform 16 is pivotally attached to the upper end 54 of the corresponding vertical support 18 by means of a pin 55. As best shown in FIG. 6, each diagonal support 20 extends from a medial portion of the corresponding vertical support 18 to the corresponding lateral side of the platform 16 toward the front end 52 of the platform 16. Each diagonal support 20 is secured in place by a removable, locking pivot pin 34 extending through a hole 56 through each end of the diagonal support 20 and through aligning holes in the platform 16 and the corresponding vertical support 18. As best shown in FIG. 5, a tubular spacer 58 is positioned between the platform 16 and the upper end 60 of the diagonal support 20 to align the diagonal support 20 with the outside of the vertical support 18 on the same side of the platform 16. The clasp 42 for securing the container 22 to the platform 16 is welded or otherwise attached to a central portion of each side of the platform 16.

FIGS. 7 and 8 illustrate the removable, locking pivot pins 34 used to secure the male members 14 within the corresponding female members 12 and the diagonal supports 20 to the platform 16 and corresponding vertical supports 18. Each pivot pin 34 has a head 62, a body 64 and a lock member 66 pivotally mounted in a longitudinal slot 68 at the end of the body 64 opposite the head 62. The diameter of the head 62 of each pivot pin 34 and the length of the lock member 66 should be greater than the diameter of the holes to be used with the pivot pin 34. With the lock member 66 parallel to the body 64, as shown in FIG. 7, the pivot pin 34 is inserted into one of the selected holes. Then the lock member 66 is rotated to be perpendicular to the body 64, as shown in FIG. 8. The head 62 and the lock member 66 prevent the pivot pin 34 from being dislodged from the hole. The pivot pin 34 is removed from the holes by rotating the lock member 66 to be parallel to the body 64 and extracting the pivot pin 34 from the holes by the head 62.

Figure 10:
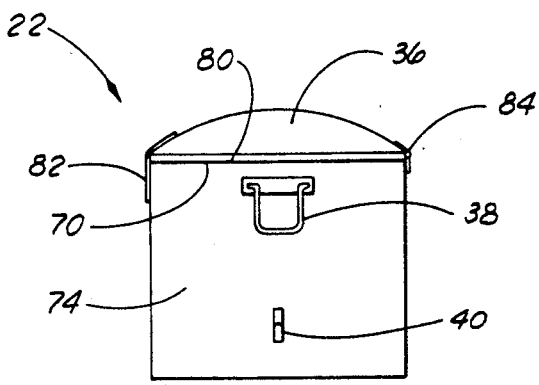
FIG. 10 is a side elevation of FIG. 9.
Figure 11:
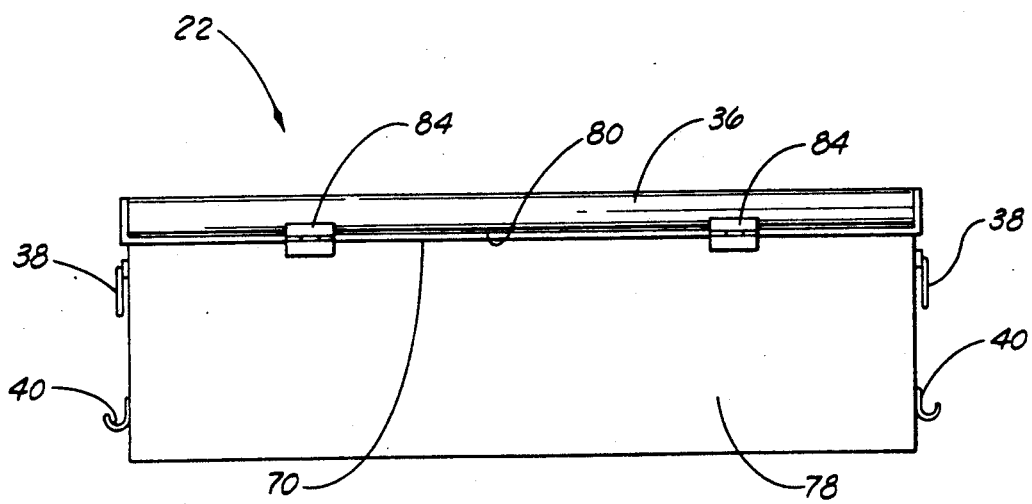
FIG. 11 is an elevational view of the container of FIG. 9 from the hinged side.

FIGS. 9 through 11 show the container 22 separately. The container 22 preferably has an open top 70 covered by the lid 36, a bottom 72, two sides 74, a front 76 and a back 78. Each side 74 of the container 22 includes one of the hooks 40 for cooperating with the corresponding clasp 42 of the platform 16 to secure the container 22 to the platform 16. As best shown in FIG. 10, each side 74 of the container 22 also includes one of the handles 38 for lifting and carrying the container 22. The juncture of the top 70 and the lid 36 is lined with a waterproof material 80, such as a plastic film, to prevent moisture from entering the container 22. As shown in FIG. 9, the front 76 of the container 22 includes a latch and lock 82 or the like to provide for the security of the contents of the container 22. As best illustrated by FIG. 11, the lid 36 is attached to the back 78 of the container 22 by a set of hinges 84.

Referring back to FIG. 1, the installation and versatility of the utility rack 10 is now described. The female members 12 are attached to the vehicle frame (not shown) toward the rear end of the vehicle (not shown). The female members 12 should be completely underneath the vehicle. When installed in this manner, the female members 12 do not create a hazard by extending past the rear end of the vehicle and the female members 12 are protected by the rear bumper of the vehicle. Normally the female members 12 are left attached to the vehicle frame, even when the utility rack 10 is not in use.

When extra carrying capacity for the vehicle is needed, the male members 14 are inserted into the longitudinal openings 28 of the corresponding female members 12. The respective holes 30 and 32 of the male members 14 and female members 12 are aligned and a pivot pin 34 is inserted through each set of holes 30 and 32. The lock member 66 of each pivot pin 34 is rotated to be perpendicular to the body 64 of the pivot pin 34 in order to retain the pivot pin 34 in its respective set of holes 30 and 32. The platform 16 is supported by on each side by the vertical support 18 and diagonal support 20. Objects to be transported may be strapped or lashed directly to the platform 16 or the container 22 may be secured to the platform 16 and the objects may be inserted into the container 22.

When installed but not in use, the platform 16 may be pivoted down to a vertical position by removing the pivot pins 34 from holes in each end of the diagonal supports 20 and then removing the diagonal supports 20. The platform 16 is then free to pivot downward to a substantially vertical position. In the vertical storage position, the platform 16 does not extend horizontally from the rear of the vehicle yet is easily returned to the horizontal carrying position by pivoting the platform 16 to horizontal and reattaching the diagonal supports 20 with the pivot pins 34.

Changes may be made in the combinations, operations and arrangements of the various parts and elements described herein without departing from the spirit and scope of the invention as defined in the following claims.

I claim:

1. An apparatus attachable to a vehicle frame for holding or supporting objects to be transported, the apparatus comprising:

a mounting plate attachable to a vehicle frame;

a pair of elongated female members rigidly attached to the mounting plate in spaced relationship to one another, each female member having a longitudinal opening;

a pair of L-shaped male members, each male member having a vertical member and a horizontal member, each vertical member having an upper end and each horizontal member having a front portion sized and shaped to fit within the longitudinal opening of a corresponding one of the female members and adapted to be removably secured to the corresponding female member;

a platform having a front end, a rear end, two lateral sides and a platform surface adapted to support the objects to be transported, the platform being pivotally attached between the upper ends of the vertical members with the front of the platform as the axis for pivoting the platform; and a pair of diagonal members, each diagonal member having a first end removably attached to a medial point of a corresponding one of the vertical members and an opposite second end removably attached to a corresponding one of the lateral sides of the platform toward the rear of the platform;

wherein the platform is movable between a substantially horizontal transporting position, wherein the diagonal members are attached, and a substantially vertical storage position, wherein the diagonal members are removed and the platform is pivoted to align with the vertical members.

2. The apparatus of claim 1 wherein the female members and the front portion of the male members are square in cross-section.

3. The apparatus of claim 1 further comprising:
a container sized and shaped to be supported by the platform, the container having a front, a rear, two lateral sides, and an opening for insertion of the objects to be transported; and
container fastening means for removably securing the container to the platform.

4. The apparatus of claim 3 further comprising:
a lid adapted for covering the opening of the container.

5. The apparatus of claim 4 further comprising:
sealing means for preventing moisture from entering the container between the opening of the container and the lid of the container.

6. The apparatus of claim 4 further comprising:
latching means for locking the lid in place to cover the opening of the container.

7. The apparatus of claim 4 further comprising:
a plurality of hinges attaching the lid to the container.

8. The apparatus of claim 4 wherein the container includes at least one handle for lifting the container.

9. The apparatus of claim 3 wherein the container fastening means further comprises:

a latch hook rigidly attached to each lateral side of the container; and
a snap latch attached to each lateral side of the platform;
wherein each snap latch cooperates with the latch hook on same side to secure the container to the platform.

10. The apparatus of claim 1 wherein the front portion of each male member has a hole therethrough and each female member has a hole therethrough and wherein each male member is removably secured to the corresponding female member by a lock pin inserted through the holes in the front portion of each male member and the corresponding female member.

11. The apparatus of claim 1 wherein the first end of each diagonal member has a hole therethrough, each vertical member has a hole therethrough and each diagonal member is removably attached to the corresponding vertical member by a lock pin inserted through the holes in the diagonal member and the corresponding vertical member.

12. The apparatus of claim 1 wherein the second end of each diagonal member has a hole therethrough, each lateral side of the platform has a hole therethrough and each diagonal member is removably attached to the corresponding lateral side of the platform by a lock pin inserted through the holes in the diagonal member and the corresponding lateral side of the platform.

* * * * *